United States Patent
Hansen

[15] 3,637,287
[45] Jan. 25, 1972

[54] METHOD AND APPARATUS FOR CONTROLLING AN OPTICAL GATE UTILIZING OPTICALLY INDUCED BIREFRINGENCE

[72] Inventor: John Wilfred Hansen, North Plainfield, N.J.
[73] Assignee: Bell Telephone Laboratories, Incorporated, Berkeley Heights, N.J.
[22] Filed: Aug. 19, 1970
[21] Appl. No.: 65,055

[52] U.S. Cl. ............................350/147, 350/150, 350/157
[51] Int. Cl. ...........................................................G02f 1/24
[58] Field of Search .......................350/150, 160, 147, 154

[56] References Cited

UNITED STATES PATENTS 3,521,070  7/1970  Duguay et al. .........................350/160

*Primary Examiner*—David Schonberg
*Assistant Examiner*—Paul R. Miller
*Attorney*—R. J. Guenther and Arthur J. Torsiglieri

[57] ABSTRACT

The opening time or framing time of an optical gate, which comprises a pair of crossed polarizers and disposed therebetween a medium in which birefringence can be optically induced, is reduced by applying sequentially to the medium first and second high intensity, fast rise time, orthogonally polarized optical control pulses delayed with respect to one another by a time $\Delta t$ corresponding to the desired opening time of the gate. The first pulse opens the gate, i.e., induces birefringence in the gate medium and thereby permits an optical signal to be gated to pass through both polarizers. At a time $\Delta t$ later the second pulse closes the gate, i.e., cancels the birefringence induced by the first pulse thereby causing the optical signal to be absorbed by one of the polarizers.

14 Claims, 2 Drawing Figures

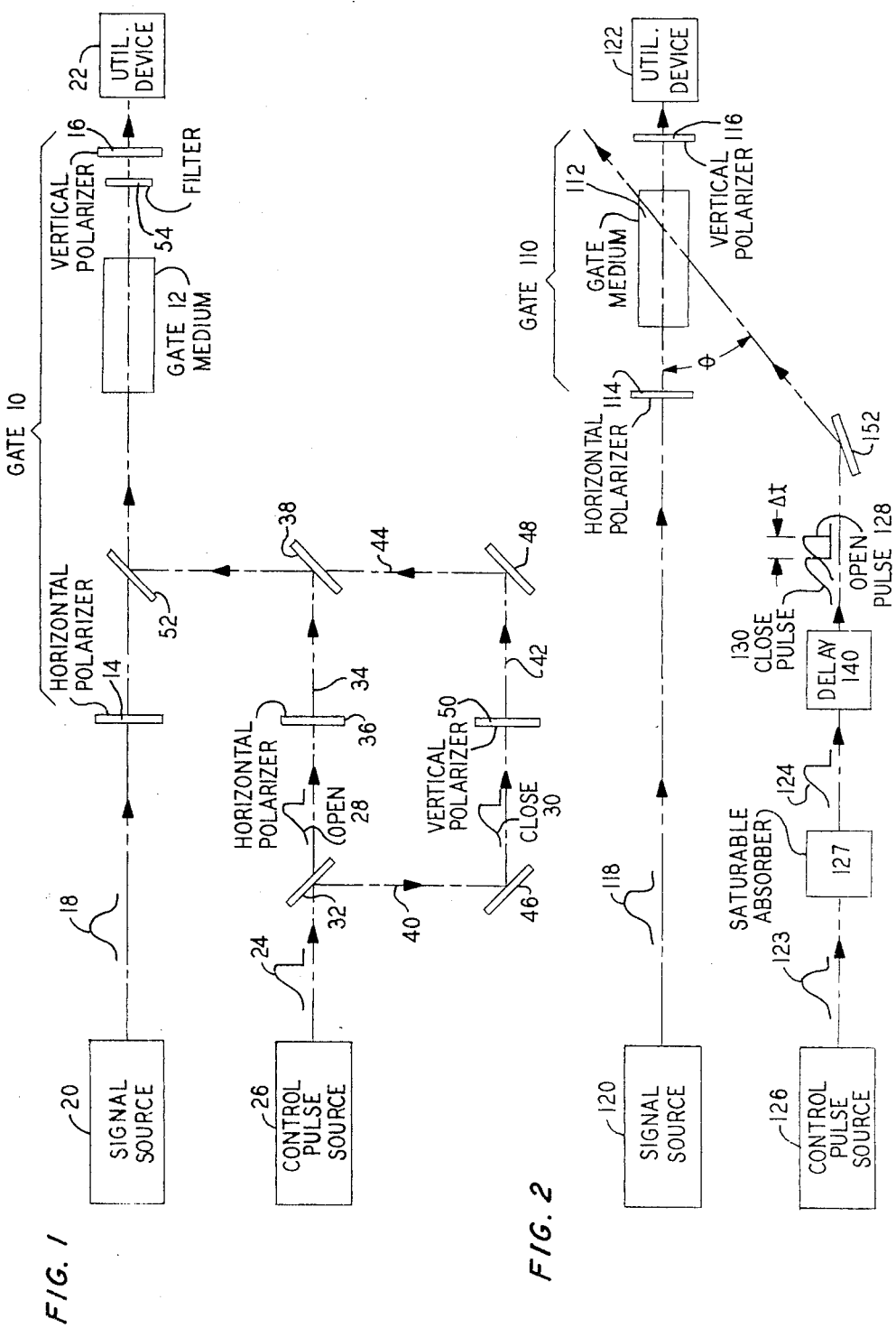

METHOD AND APPARATUS FOR CONTROLLING AN OPTICAL GATE UTILIZING OPTICALLY INDUCED BIREFRINGENCE

BACKGROUND OF THE INVENTION

This invention relates to optical gates and, more particularly, to apparatus and methods for reducing the opening time of optical gates employing a gate medium in which birefringence can be optically induced.

In several copending applications M. A. Duguay discloses a fast rise time optical gate comprising illustratively a pair of crossed polarizers and disposed therebetween a gate medium, such as carbon disulfide or glass, in which birefringence can be optically induced. An optical signal to be gated is transmitted through one of the polarizers and the medium and, without more, is absorbed by the second polarizer. The gate is thus closed. To open the gate, a high intensity, subpicosecond optical control pulse is made coincident with the signal in the medium, thereby optically inducing birefringence therein and causing the polarization of the signal to be rotated, preferably by 90°. Consequently, the signal is transmitted through the second polarizer. The gate is thus open. In application Ser. No. 23849 filed on Mar. 30, 1970 and assigned to the assignee hereof, this optical gate is disclosed in several embodiments including an optical amplitude modulator, and in another copending application Ser. No. 47838 filed on June 19, 1970 and also assigned to the assignee hereof, this optical gate is utilized as a camera shutter in a form of ultrafast photography which enabled for the first time the direct display of picosecond optical pulses. As discussed in both of these applications, however, the opening time or framing time of the optical gate is limited by either the inherent relaxation time of the gate medium or the width of the optical control pulse, which ever is longer. Thus, for example although the gate might employ a medium such as carbon disulphide having a relaxation time of about 2.0 picoseconds, if the control pulse width were 10 picoseconds, the latter would limit the effective opening time of the gate as a whole.

It is therefore an object of the present invention to reduce the opening time of the aforementioned kind of optical gate.

It is another object of the present invention to reduce the opening time without the need for control pulses of width less than or equal to the desired opening time.

SUMMARY OF THE INVENTION

These and other objects are accomplished in accordance with an illustrative embodiment of the invention in which the opening time of an optical gate is controlled by means of first and second fast rise time, orthogonally polarized, high intensity optical control pulses applied sequentially to the gate medium. The first pulse applied induces birefringence in the medium rotating the polarization of the signal to be gated thereby permitting it to be transmitted through the gate (i.e., through the second polarizer). The second pulse, delayed with respect to the first by a time corresponding to the desired opening time, cancels the birefringence induced by the first pulse thereby causing the signal to be absorbed by the second polarizer.

In order to produce a well-defined opening and closing of the gate, the high intensity, orthogonally polarized control pulses should have very fast rise times, e.g., of the order of one picosecond or less. Such pulses are produced in one embodiment by means of a bleachable dye. These pulses are then delayed with respect to one another by several techniques, e.g., by causing the pulses to traverse paths of different lengths or by passing a single pulse through a delay element such as a calcite crystal. The latter method is particularly advantageous since the pulses produced by the crystal are inherently not only delayed with respect to one another but also orthogonally polarized.

BRIEF DESCRIPTION OF THE DRAWINGS

These and other objects of the invention, together with its various features and advantages, can be more easily understood from the following more detailed description taken in conjunction with the accompanying drawing in which:

FIG. 1 is a schematic of an illustrative embodiment of the invention; and

FIG. 2 is a schematic of a second embodiment of the invention.

DETAILED DESCRIPTION

Before discussing the invention in detail, a discussion of an optical gate employing a medium in which birefringence can be optically induced will be presented. As shown in FIG. 1, the gate 10 comprises a gate medium 12 disposed between a pair of crossed polarizers 14 and 16. In practice, however, the gate medium need be used with only a single polarizer 16 if the signal 18 being gated is already polarized (e.g., inherently by source 20). In either case, a high intensity (e.g., 20 gigawatts/cm.$^2$, plane polarized optical control pulse passes through the gate medium 12 and optically induces therein changes in its refractive index. These changes, as will be described hereinafter, affect the polarization of a second, usually less intense (e.g., 100 times smaller), optical signal pulse 18 which is also transmitted through the gate medium 12. The latter signal constitutes the signal to be gated. The refractive index change for signal pulse light polarized parallel to the electrical field of the control pulse in general differs from the refractive index change for light polarized normal to this field. The resulting birefringence, or net change in index of refraction between the changes in the parallel and normal directions, is proportional to the product of the nonlinear index of the gate medium 12 and the square of the peak electrical field of the control pulse.

By way of illustration, a picosecond optical control pulse having a peak power density of 22 gigawatts/cm.$^2$, which corresponds to a peak optical field of $4.07 \times 10^6$ volts/cm., induces in glass, having a nonlinear index of about $2 \times 10^{-13}$ electrostatic units, a birefringence of about $1.84 \times 10^{-5}$, which is considerable. Of course, materials with a higher nonlinear index, such as those listed below, will have even greater birefringence.

The following Table I lists the approximate nonlinear indices and passbands of a group of gate media particularly useful in accordance with the teachings of this invention. Each of these materials has an intrinsic rise time of about $10^{-15}$ seconds, except carbon disulphide and carbon tetrachloride which have respective rise times of about 2.0 picoseconds, and 0.5 picosecond.

TABLE I

| Gate Medium | Nonlinear Index ($\times 10^{-13}$ esu) | Passband (microns) |
| --- | --- | --- |
| Carbon Disulphide | 200 | 0.3–5 |
| Carbon Tetrachloride | 4 | 0.3–5 |
| Germanium | 8,000 | 1.8–23 |
| Silicon | 2,500 | 1.2–15 |
| Gallium Arsenide | 2,500 | 1.0–15 |
| Diamond | 600 | 0.25–80 |
| Strontium Titanate | 600 | 0.4–6 |
| Cuprous Chloride | 30 | 0.5–11 |
| Glass (heavy flint) | 30 | 0.4–4 |
| Fused Quartz | 2 | 0.12–4.5 |
| Glass (BK-7) | 2 | 0.37–3.5 |

The passband of $CS_2$ includes in addition a 1–2 $\mu$m. hole centered at about 10.6 $\mu$m. In the case of solid media, high purity, single crystals free of substantial strain birefringence are preferred. Alternatively strain birefringence can be compensated for by techniques well known in the art e.g., by use of a Babinet-Soliel compensator.

It should be noted here that the polarization of the signal pulse 18 is technically not rotated, rather it changes continuously from vertical to elliptical (in which the major axis of the ellipse is vertical), to circular, to elliptical (in which the major axis of the ellipse is horizontal) and finally to horizontal, thereby effecting a 90° change in the polarization. To maximize this change in polarization it is preferable that the polarization of the control pulse be at 45° to the polarization of the signal pulse. Moreover, to effect the preferred 90° change in polarization, it is desirable that the signal pulse intensity be considerably less intense than the control pulse intensity so that the signal pulses induce only a negligible amount of birefringence in the gate medium. In addition, since the phase retardation in a given gate medium is proportional to the product of the length of the medium in the direction of light propagation, and the power density, these parameters are chosen to produce the desired 90° change in polarization. For example, in glass (BK-7), (BK-7), is about 1.44 cm. for a control pulse peak power density of about 22 gigawatts/cm.$^2$ (at about 1.06$\mu$) and a signal pulse power density of about 0.2 gigawatts/cm.$^2$ (at 0.53$\mu$). Typically, the glass body is 1 centimeter square in cross section.

In the absence of a control pulse applied to medium 12 the signal pulse 18 is horizontally polarized by polarizer 14, is unaffected by medium 12 and ultimately is absorbed by vertical polarizer 16. The presence of a control pulse, however, rotates the polarization of the signal pulse as it passes through medium 12 thereby permitting it to be transmitted through vertical polarizer 16 to a utilization device 22.

As discussed previously, in techniques used heretofore primarily the width of the single control pulse, typically in the picosecond range, dictates the opening time of the optical gate as a whole. Thus, a single control pulse of 10.0 picosecond duration applied to a CS$_2$ gate medium produces an opening time of about 10.0 picoseconds even though the relaxation time of CS$_2$ is about 2.0 picoseconds. In the present invention, however, the time delay separation of a pair of control pulses, not their pulse width, determines the opening time of the gate.

Thus, in accordance with one aspect of the invention as shown in FIG. 1, a single fast rise time (e.g., 1 picosecond rise time) optical control pulse 24 generated by source 26 (e.g., a laser) is divided into a pair of such pulses 28 and 30 by beam splitter 32. Pulse 28, used to open the gate, traverses path 34 passing through horizontal polarizer 36 to a reflecting front surface of reflector 38. Pulse 30, on the other hand, traverses a polygonal path (including legs 40, 42 and 44 formed by reflectors 46 and 48), passing through vertical polarizer 50 located in leg 42 to a transmissive, rear surface of reflector 38. Thus, open-pulse 28 and close-pulse 30 are orthogonally polarized with the latter delayed by a time with respect to the former by an amount $\Delta t$ proportional to the difference in length between path 34 and path 40, 42, 44. Each pulse is made incident on reflector 52, located between polarizer 14 and medium 12, for transmission through gate medium 12 coincident with signal pulse 18.

In operation, control pulse 28 optically induces birefringence in medium 12 thereby causing the polarization of horizontally polarized signal pulse 18 to be rotated to vertical for transmission through vertical polarizer 16. At a time $\Delta t$ later, control pulse 30 closes the gate by cancelling the induced birefringence causing horizontally polarized signal pulse 18 to be absorbed by vertical polarizer 16. In essence, the gate is open only for the time $\Delta t$ corresponding to the delay between the control pulses. Typically the control and signal pulses are of different wavelengths, with the former being prevented from reaching utilization device 22 by an appropriate rejection filter 54.

The effect of the second control pulse in cancelling the birefringence induced by the first control pulse can be understood as follows. Consider that the first and second control pulses are polarized, respectively, in the $x$ and $y$-directions. Then, the first pulse induces a change (i.e., anisotropy) in the index of refraction $n$ in the $x$-direction such that the distribution in the $x$-$y$ plane of $n$ versus $\phi = \tan y/x$ is elliptical with major axis in the $x$-direction. The second control pulse, being orthogonally polarized to the first, induces a change in index of refraction in the $y$-direction such that the distribution of $n$ versus $\phi$ is also elliptical, but with major axis in the $y$-direction. If the magnitudes of the respective control pulses are equal, the algebraic sum of these elliptical distributions add to produce a circular distribution (i.e., isotropy). In this sense, the second control pulse cancels the birefringence induced by the first control pulse.

While in the embodiment of FIG. 1 the control pulses and the signal pulse are shown to propagate collinearly through the gate medium, in the embodiment of FIG. 2, the control pulses pass through the medium at an angle $\theta$ with respect to the direction of propagation of the signal pulse. In this respect care should be exercised to prevent excessive time delay or phase retardation between each control pulse and the signal pulse. Such time delay, which causes the control and signal pulses to spatially separate, may arise from group velocity mismatch produced by signal and control pulses at different wavelengths, (as in either FIG. 1 or FIG. 2) or it may arise from a difference in path lengths in the medium of the signal and control pulses (as in FIG. 2). This path difference is caused by the angle $\theta$ between the directions of propagation of the respective pulses. In this regard, it is preferable that the angle $\theta$ be less than about 10°.

Accordingly, as shown in FIG. 2 with numerals corresponding to FIG. 1 increased by 100, a signal source or laser 120 generates an optical signal pulse 118 for transmission to utilization device 122 through an optical gate 110 comprising a gate medium 112 disposed between crossed polarizers 114 and 116. A single optical control pulse 123, typically about 10 picoseconds in duration, is generated by source 126. This pulse is passed through a saturable absorber 127 (e.g., a bleachable dye) to produce a single fast rise time (e.g., less than 1 picosecond) control pulse 124 which in turn is made incident upon a delay element 140. The latter is typically a birefringent crystal of length chosen to produce the desired delay $\Delta t$. The output of delay element 140 comprises a pair of fast rise time pulses 128 and 130 which are not only delayed in time with respect to one another by an amount $\Delta t$ but also are orthogonally polarized. In order to produce such control pulses of approximately equal intensity it is preferred that pulse 124 be plane (e.g., at about 45° to the optic axis of the birefringent crystal used in delay element 140.

The pair of control pulses 128 and 130 are then reflected from reflector 152 to incidence on medium 112 at an angle $\theta$ and by means well known in the art are made to be coincident therein with signal pulse 118 whose polarization is at 45° to that of both control pulses. The operation of these control pulses in opening the gate for a time $\Delta t$ is as described above with reference to FIG. 1.

The following materials and parameters are provided for the purpose of illustration only and are not to be construed as limitations on the scope of the invention. The bleachable dye typically comprises commercially available Eastman Kodak 9860 or 9740 for operation at 1.06$\mu$m. which is output wavelength of both the Nd:glass and Nd:YAG lasers. At 6943 A., an output wavelength of the ruby laser, alcohol or acetone solutions of diethyldicarbocyanineiodide (DDI), pthalocyanine or cryptocyanine can be used. On the other hand, delay element 140 typically comprises (to produce about 1 picosecond delay) a calcite crystal 0.16 cm. long and 1 cm. square in cross section for use at 1.06$\mu$m. Such a crystal produces about 0.59 picoseconds of delay per millimeter of thickness.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, it is desirable in order not to drastically reduce the intensity of the signal pulse transmitted through the gate, that the fast rise time $\tau$ of the control pulses be less than or equal to the desired opening time $\Delta t$. Otherwise, the delayed close-pulse will close the gate before the open-pulse has completely opened the gate. In this respect, even if $\tau > \Delta t$, the opening or framing time is still the desired $\Delta t$, but transmission of the signal is reduced.

What is claimed is:

1. A method of controlling an optical gate which includes a medium in which birefringence can be optically induced and which is adapted to control the transmission of an optically polarized signal passed through said medium comprising the steps of generating a first fast rise time, high-intensity optical control pulse linearly polarized in one direction, generating a second fast rise time, high-intensity optical control pulse linearly polarized orthogonal to said one direction, delaying in time one of said control pulses with respect to the other, applying said other control pulse to said medium to open said gate and thereafter applying said delayed control pulse to said medium to close said gate.

2. The method of claim 1 wherein said generating steps include the steps of generating a single fast rise time, high-intensity optical control pulse, making said single control pulse incident upon a beam splitter to produce first and second fast rise time control pulses of substantially equal intensity, causing said first pulse to traverse a first path including a first polarizer, causing said second pulse to traverse a second path including a second polarizer orthogonally polarized to said first polarizer, and wherein said delaying step includes making the lengths of said first and second paths unequal.

3. The method of claim 2 wherein said gate includes further a pair of spaced, crossed polarizers, said medium being disposed therebetween and said signal being transmitted through at least one of said polarizers.

4. The method of claim 1 wherein said generating steps include the steps of generating a single high-intensity, optical control pulse, passing said pulse through a saturable absorber to produce a single fast rise control pulse, passing said latter pulse through a birefringent medium to produce said first and second control pulses delayed in time with respect to one another, orthogonally polarized with respect to one another, and of substantially equal intensity.

5. The method of claim 4 wherein said gate includes a pair of spaced polarizers, said medium being disposed therebetween, said signal being transmitted through at least one of said polarizers and said medium to incidence upon the other polarizer.

6. The method of claim 5 wherein said applying step includes the step of making said control pulses traverse a path through said medium at an angle less than 10° to the path of said signal through said medium.

7. An optical gate for controlling the transmission of an optically polarized signal between an optical source and a utilization device,
   at least one polarizer, said polarizer disposed between said source and said device
   a gate medium in which birefringence can be optically induced, said medium being disposed between said source and said polarizer,
   means for generating a first fast rinse time, high-intensity optical control pulse plane polarized in a first direction,
   means for generating a second fast rise time, high-intensity optical control pulse plane polarized in a direction orthogonal to said first direction,
   means for delaying said first and second pulses with respect to one another, and
   means for sequentially applying said pulses to said medium coincident with the transmission therethrough of said signal.

8. The gate of claim 7 wherein said signal is plane polarized in a direction of about 45° to each of said control pulses and the latter are of substantially equal intensity.

9. The gate of claim 8 wherein said delaying means comprises means for causing said first and second control pulses to traverse, respectively, first and second optical paths of different lengths.

10. The gate of claim 9 wherein said first path includes a first polarizer and second path includes a second polarizer orthogonally to said first polarizer.

11. The gate of claim 10 wherein said signal and said control pulses are of different optical wavelengths and traverse said medium collinearly, and in combination with filter means for preventing said control pulses from being incident upon said utilization device.

12. The gate of claim 8 wherein said first and second control pulse generating means include a source of a high-intensity optical control pulse, a saturable absorber upon which said control pulse is made incident to generate a fast rise time, high-intensity control pulse, a birefringent medium, said fast rise time control pulse being transmitted through said birefringent medium to produce said first and second control pulses delayed in time and orthogonally polarized with respect to one another.

13. The gate of claim 12 wherein said high-intensity control pulse is plane polarized at about 45° to the optic axis of said birefringent medium.

14. The gate of claim 13 wherein said control pulses are transmitted through said medium at an angle of less than 10° to the direction of propagation therethrough of said signal.

* * * * *

UNITED STATES PATENT OFFICE
CERTIFICATE OF CORRECTION

Patent No. 3,637,287            Dated January 25, 1972

Inventor(s) John Wilfred Hansen

It is certified that error appears in the above-identified patent and that said Letters Patent are hereby corrected as shown below:

Column 3, line 18, after "(BK-7)," first occurrence, delete "(BK-7)," and insert --the length--.

Column 3, line 75, after "versus" change "$\phi$" to --$\varphi$--.

Column 4, line 4, after "versus" change "$\phi$" to --$\varphi$--, after "in" change "they-direction" to --the y-direction--.

Column 4, line 44, after "plane" delete "(e.g." and insert --polarized--.

Signed and sealed this 2nd day of January 1973.

(SEAL)
Attest:

EDWARD M. FLETCHER, JR.
Attesting Officer

ROBERT GOTTSCHALK
Commissioner of Patents